Dec. 26, 1939.                R. R. CLARK                2,184,281
                       METHOD OF MAKING CLOSURES
                          Filed July 26, 1935

Inventor
Ralph R. Clark
by
Walter F. Kaufman
Attorney

Patented Dec. 26, 1939

2,184,281

UNITED STATES PATENT OFFICE 2,184,281

METHOD OF MAKING CLOSURES

Ralph R. Clark, Lancaster, Pa., assignor to Armstrong Cork Company, Lancaster, Pa., a corporation of Pennsylvania Application July 26, 1935, Serial No. 33,205

20 Claims. (Cl. 219—13)

My invention relates to a method of making closures and contemplates a method in which heat is generated in an electrical current conducting material forming part of the closure in an amount sufficient to activate a heat activatable material disposed in the heating zone thereof. The activated material may serve to secure a sealing liner to a shell or may serve as a binder for a plastic mass adapted to form a sealing liner upon setting.

My method is particularly adapted for practice in the manufacture of crown seals and other closures which include a metal shell, such as tin coated, steel plate. Metals of this type are peculiarly adapted for heating by induced electrical current.

Crown seals are usually provided with a lithographed decoration on their exposed surface which may be covered with a protective coating of varnish. The decoration is heat sensitive and is softened when heat above a limited temperature is applied to the surface. When the decoration is in softened condition, it is particularly susceptible to marring; abrasion caused by mechanical movement, such for example, as would be encountered in the usual finger-bar mechanism employed to move the shells along a heating zone may often result in shells having the decoration badly "skinned".

The sealing liners for crown closures are generally formed of cork composition discs and numerous types of adhesive are used to secure them to the shells. Adhesive lacquer is widely used since it permits ready application to the sheet plate prior to formation of the shells; it is convenient to handle; it is heat softenable and may be rendered adhesive at a relatively low temperature. Albuminous, latex and other heat coagulable types of adhesives are sometimes employed. These are supplied to the shell in liquid form for subsequent heat coagulation. Another adhesive commonly used is animal or vegetable glue dissolved in a suitable vehicle, such as water; the water be'ng driven off to set the adhesive and secure the liner to the shell.

Bottle closures may also be provided with a liner formed from a plastic mass which is initially flowed into the shell and thereafter set or hardened therein. Latex has been used for this purpose and there are commercially available, plastic compositions suitable for this purpose. With the "flowed-in" types of liners, heat coagulation is desirable in order to effect rapid activation of the binder.

In the manufacture of closures of the above types by processes heretofore known, a gas flame is applied to the decorated or exposed side of the shell to heat the adhesive or binder applied to the inner surface of the shell to a degree sufficient to set the same. Considerable difficulty has been experienced by reason of the use of a flame for heating; oxidation, and attendant yellowing of the lithographic ink employed in the decorative coating, often resulting. In order to elevate the temperature of the inner surface of the shell to a degree sufficient to cause activation of the material to be bonded thereto, a relatively higher temperature must exist on the outer or decorated surface, and, since the flame is directed against this decorated surface, it is difficult, if not impossible, to provide means for dissipating heat in an amount sufficient to prevent any deleterious action upon the applied decoration or coating.

Prior processes have all been relatively slow because speed of movement of the shells has been dependent upon the length of the heating zone, and space requirements have necessitated relatively slow movement of the shells through the heating zone.

According to the process contemplated by this invention, in which heating is effected by induced electrical current within the shell or other conducting portion of a closure, the heating effect is relatively rapid and, since the heat is generated directly within a portion of the closure, it is possible to effectively cool any desired surface of the closure by means of cooling fluid or otherwise to rapidly dissipate heat from the surface to be cooled.

The type of adhesive or binder employed in my method is not critical since heat may be readily absorbed from the decorated surface at a rate sufficient to prevent discoloration or softening. Any of the currently used adhesives or binders may be used and other binders which are now objectionable because of their high melting or fusion point may be employed if careful control of the temperature at the decorated surface be observed; heat dissipation being essential if the melting point of the activatable material be higher than the temperature at which the decorative or other coating would be rendered soft, discolored or shriveled.

In the attached drawing illustrating certain preferred embodiments of my invention:

My invention will be particularly described in connection with crown seals which form one of the major fields to which my invention is applicable. It will be understood, however, that my method is suitable for practice in the manufacture of types of closures other than metallic caps, including molded closures made of non-conducting material.

Figure 1:
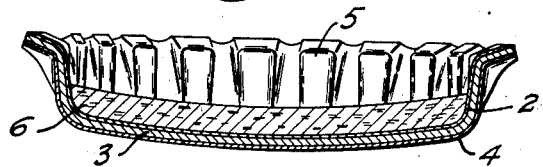
Figure 1 is a sectional view of a crown seal in which the liner is secured to the shell by means of a heat activatable adhesive disposed between the sealing liner and shell.

Figure 1 shows a crown closure having a coating 2 of adhesive lacquer, or other suitable heat activatable adhesive, disposed on the inner surface of a crown shell 3 and having a decorative coating 4 applied to the top and skirt portions. In carrying out my invention in the manufacture of a crown of this type, the preferred procedure would comprise applying a suitable lithographic design or color to a sheet of tin coated steel plate and, after the decoration has dried, applying a heat activatable adhesive to the other side of the plate; dieing shells from the plate after the lacquer has dried and become hard; forming the died blanks into the desired shape; positioning a sealing liner within the shell in engagement with the adhesive and then heating the top of the shell by induced electric current to a degree sufficient to activate the adhesive. In order that adhesive applied to the skirt portion 5 will not be removed upon insertion of the liner, it is preferred to insert a liner 6 into the shell 3 and in engagement with the adhesive 2 prior to heat activation thereof.

Figure 4:
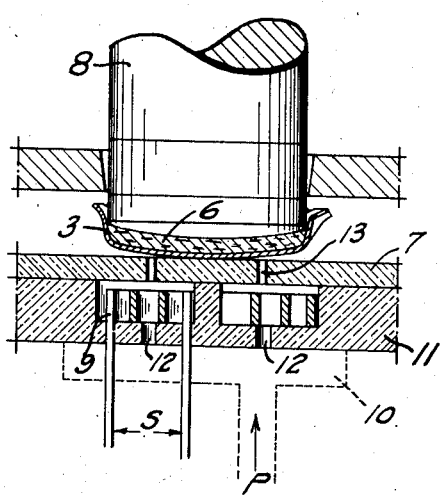
Figure 4 is a sectional view of a mechanism suitable for use in the practice of my invention.

A suitable apparatus for carrying out the method of my invention is more completely illustrated and described in my copending application, Serial No. 72,489, filed April 3, 1936. In Figure 4 a device is illustrated which will furnish a general understanding of the practice of my method when effectuated by use of the apparatus. Figure 4 shows the crown shell 3 in position on a support 7 with a plunger 8, preferably spring urged, holding the sealing liner 6 in engagement with the shell 3. An inductor coil 9 for conducting high frequency electrical current is disposed below the support 7 and is energized by a suitable source S of high frequency current. A preferred circuit for the high frequency source is shown and claimed in the copending application of Emil R. Capita, Serial No. 33,337, filed July 26, 1935. Any current source having current and frequency characteristics satisfactory for generating the required degree of heat in the conducting portion may be used. The type of inductor coil shown in Figure 4 is preferred because of its uniform heating effect and is illustrated and claimed in a copending application of Emil R. Capita, Serial No. 33,336, filed July 26, 1935.

According to my preferred procedure using dried adhesive lacquer as the securing agent, the shell 3 is positioned upon the support 7 and the liner 6 is urged into position within the shell. Current is then supplied to the inductor coil 9 to effect heating of the metal shell 3 by induced electrical heating current. The positioning of the coil with respect to the shell should be such that the shell lies within the field of flux of the inductor coil 9; the flux preferably threading the top portion of a shell uniformly throughout its area but not materially heating the skirt portion. Sufficient heat is generated in the shell by the electrical current thus induced to activate the adhesive 2.

In order to prevent any substantial rise in temperature in the outer or decorated surface of the shell, a suitable cooling fluid may be introduced into a port P in a housing 10 positioned adjacent a support 11 for the coil 9. The support 11 is provided with openings 12 passing upwardly from the housing 10 into the coil chamber, and the closure support 7 is provided with openings 13 extending from the coil chamber to a position below the shell. An air blast cooler may be employed in which cooled air passes through port P into the housing 10, thence through the openings 12 into the inductor coil chamber, passing through the openings 13 and being forced against the decorated surface 4 of the shell 3. It will be noted that the shell 3 has a convex top and that cooling fluid passing through the openings 13 will follow the contour of the shell, thus assuring uniform cooling thereof. Cooling fluid may be supplied continuously from the port P or may be suitably controlled for intermittent operation to suit the desired requirements of materials being operated upon. It is often desirable to permit the adhesive to cool while the liner remains under pressure within the shell to thus assure a more positive engagement of the component parts prior to complete activation of the adhesive. The cooling fluid may be used to accelerate this cooling.

If albuminous or other coagulating types of adhesive which may be activated at a relatively low temperature are used, cooling may not be necessary. For example, egg albumen which is commonly employed, sets up at about 180° F. and this temperature is well below the range at which the decoration would be materially affected. Latex types, likewise, coagulate at a relatively low temperature.

In carrying out my process, using a heat coagulating adhesive, the adhesive is preferably supplied to the shell or liner in liquid form and, after positioning of the liner in the shell under pressure, the adhesive is activated by heat induced within the shell or other conducting material forming part of the closure. With glue or gelatin as the adhesive, it may be found desirable to supply the glue in liquid form, heat and then position the liner and cool.

Figure 2:
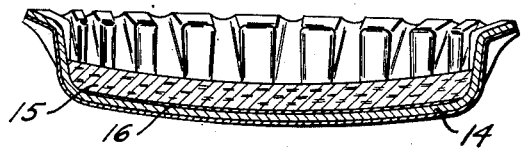
Figure 2 is a sectional view of a crown shell in which a heat activatable adhesive is carried by a web, such as "process paper"

In Figure 2 a modified crown closure is shown. This type comprises a shell 14 and a liner 15; the elements being held together by an adhesive disposed upon a carrier disc 16, preferably "process paper". The paper 16 and the liner 15 may be laminated together or the paper 16 may be inserted as a separate element. It is preferably punched from a ribbon and fed directly into the shell and the liner positioned thereover. A commonly used type of process paper comprises a sheet of kraft paper having a resinous adhesive disposed on each side thereof; the adhesive being heat activatable at a relatively low temperature.

When using process paper, it is desirable to hold the component elements in firm engagement during heat activation in order that a strong bond be obtained.

A preferred procedure in carrying out the process would, accordingly, be to dispose a disk of process paper within a shell; position a sealing liner thereover; apply pressure to the various elements and then heat the shell by induced electrical heating current in an amount sufficient to activate the adhesive, thus securing the paper to the shell and the liner to the paper. If the process paper requires a relatively high temperature for activation, heat dissipation is desirable.

The sealing liners in the embodiments shown in Figures 1 and 2 serve to confine heat within the shell and are effective for preventing radiation of heat from that surface, making it possible to rapidly effectuate activation of the heat activatable material disposed between the liner and the shell.

Figure 3:
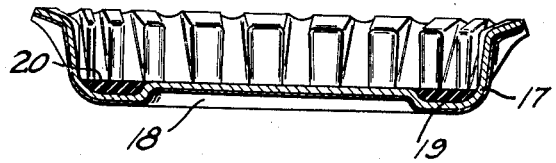
Figure 3 is a sectional view of a crown shell embodying a "flowed in" liner in which the binder is of a material capable of being heat activated.

In Figure 3, a crown shell 17 is shown having a depressed center portion 18 and an annular liner receiving portion 19 in which is disposed a sealing liner 20. The liner 20 may be formed of any suitable composition including a heat activatable binder. A latex bonded composition possesses many desirable characteristics and is readily adapted for use in my process. The plastic material forming the liner 20 is preferably flowed into the annular portion 19 and permitted to "level out". Heat is then applied by inducing electrical current directly within the shell in an amount sufficient to activate the binder. Heat may be dissipated from the decorated surface as in the other embodiments of my invention if desired. Generally speaking, however, such cooling will not be necessary unless the binder employed requires a relatively high temperature for activation.

In each of the embodiments above described, heat for effecting activation of a material is generated by inducing electrical heating current within a conducting shell by disposing the shell in the field of a flux of an inductor coil carrying a high frequency current.

Figure 5:
Figure 5 is a sectional view of a modification of my invention in which the electrical current conducting member is in the form of a thin metal disc disposed within a non-conducting shell.

In Figure 5 a modification is illustrated in which a conducting member disposed within the shell is heated to effect activation. The shell may be made of "Bakelite" or other non-conducting material, and this method will also be advantageous in the manufacture of closures having shells of material which cannot readily be heated by induced high frequency current and which does not shield the resistant conductor from the flux. The modified process may also be desirable in certain instances, even where the closure shell is made of conducting material capable of being readily heated by induced electrical current.

Referring specifically to the embodiment shown in Figure 5, the shell of a molded screw closure 21 is provided with a depression adapted to receive a sealing liner 22 of carboard, cork composition, or other suitable lining material. The liner 22 is held in place within the shell by means of an adhesive layer 23 carried by a conducting disc 24, preferably of tin plate or other conducting material, having a film of adhesive 25 disposed betwen the conducting member 24 and the top or head portion of the shell 21. With this type of closure, my new method may be utilized by providing a disc of metal carrying a dried coating of adhesive lacquer on each side thereof. The disc is disposed in the cap adjacent the top thereof and a sealing liner positioned thereover. Pressure may be applied to the component elements and the shell disposed in the field of flux of a radiating coil carrying high frequency electrical current for a period of time sufficient for heat induced in the disc by the high frequency current to activate the adhesive applied to the surfaces of the metal disc. Even though the closure be made of "Bakelite" or other electrical insulating material, it is possible to inductively heat the metal disc although it be separated from the radiating coil by a wall of insulation material forming the top of the shell. Any suitable heat activatable adhesive may be substituted for the adhesive lacquer in this process. If albuminous or other heat coagulating type of adhesive be used, for example, it may be supplied in dry form on the metal disc or may be deposited in liquid form in the shell and a second application applied to the exposed face of the metal disc disposed within the closure and in engagement with the albumin deposited in the shell. Heating may then be effected as disclosed above in the other embodiments.

By utilizing high frequency current for heating, the speed of manufacture of closures may be greatly increased, for the heating action resulting from induced electrical heating currents within a conducting member is substantially instantaneous when large currents are employed so that activating temperature is quickly reached. This is in sharp contrast to present methods wherin heat is applied to the decoration and must disseminate itself through the coating into the shell and through the shell. In the prior art methods, the hottest portion is not the portion it is desired to heat, in fact it is the portion that should be kept cool. In the present method the temperature gradient is reversed; the coolest part is the part most likely to be adversely affected by heat, and the hottest part is the part where heat is required to effect a bond. The temperature of any surface adjacent the material to be activated may be closely controlled while other surfaces which may carry decoration, or other material deleteriously affected by heat, may be effectively cooled, thus avoiding many of the difficulties now encountered by practice of the present methods of manufacture. By eliminating a heating flame, the problem of preventing yellowing is obviated and white or very light colors may economically be produced commercially.

A further advantage of my method, when utilizing the high frequency oscillator of the type disclosed in the copending application of Capita, Serial No. 33,337, above referred to, is that only the metal portion of the closure which is to be utilized to activate the adhesive is subjected to heat, and the metal parts of the machine surrounding the closure are not affected as in the case in the old type of gas flame heaters. It is obvious that the cooling cycle may be speeded up considerably if the thermal capacity and thermal lag are reduced to a minimum. In the gas flame type, the metal parts are all relatively warm after passing through the heating zone and cooling, therefore, requires a relatively longer period.

By my process, heat activation of an adhesive or bonding agent may be conveniently carried out at relatively high speed and with activatable materials having melting points which may vary over a relatively wide range without in any manner adversely affecting a delicate lithographic decoration or other coating composition applied to the closure. It also permits the use of heat activatable adhesivies in molded or other substantially non-conducting shells which have heretofore been secured with water soluble or other "cold" adhesives.

While I have illustrated and described the present preferred embodiment of my invention, it will be understood that my invention is not so limited but may otherwise be practiced and embodied within the scope of the following claims.

I claim:

1. The method of making closures by heat activation of a material, the step consisting in inducing electrical heating current within electrical current conducting material forming part of a closure in an amount sufficient to activate said activatable material.

2. The method of making closures having a body portion formed of thin, electrical current conducting metal with a heat sensitive coating on the outer surface thereof and a heat activatable material disposed within the body portion, the step consisting in inducing electrical heating current within the body portion in an amount sufficient to activate said activatable material without elevating the temperature of the coating to a degree sufficient to deleteriously affect the same.

3. The method of softening one of two coating which soften at different temperatures and are located on different sides of a thin metal disc, which includes the step of raising the temperature of the disc by electric inductive action at a rate sufficient to soften the low temperature coating in a predetermined time while preventing any substantial rise in temperature of the higher temperature coating sufficient to deleteriously affect the same.

4. A method of securing a liner to an electrical current conducting closure shell having a heat activatable adhesive disposed therebetween, including the step of inducing electrical heating current within the shell to elevate the temperature thereof to a degree sufficient to activate said adhesive.

5. A method of securing a liner to an electrical current conducting closure shell having a heat sensitive coating thereon, including the steps of applying a heat activatable adhesive to a portion at least of one of the contacting surfaces of the shell and liner, applying pressure between the shell and liner, and activating said adhesive by inducing electrical heating current within the shell to elevate the temperature thereof to a degree sufficient to effectuate heat activation of the adhesive without elevating the temperature of the coating to a degree sufficient to deleteriously affect the same.

6. A method of assembling liners in bottle closures by means of a heat activatable adhesive, the steps including positioning a sealing liner in a conducting shell having a decorative coating on the exterior thereof deleteriously affected by elevated temperature, there being a dried coating of adhesive on a portion at least of one of the contacting surfaces, and thereafter heating the shell by inducing electric heating current therein to raise the temperature thereof to a degree sufficient to activate said adhesive without deleteriously affecting said decorative coating.

7. A method of assembling liners in bottle closures having a fusible adhesive applied to one of the elements to be bonded and having at least one of the elements capable of conducting electric current, the step consisting in inducing electric heating current in a portion at least of the element which is capable of conducting electric current to elevate the temperature thereof to a degree sufficient to fuse said adhesive.

8. A method of making bottle closures consisting in coating one face of a sheet of electrical current conducting material with a heat activatable material and another surface thereof with a heat sensitive material, drying said coatings, forming a closure shell from said sheet, said shell having skirt and top portions with the heat activatable coating extending substantially over the entire inner surface thereof and the heat sensitive coating extending over the top portion at least thereof, positioning a sealing liner in contact with a portion of the inner surface of the shell and thereafter inducing electrical heating current within the shell in an amount sufficient to activate said adhesive to bond said liner to said shell without elevating the temperature of the heat sensitive coating to a degree sufficient to deleteriously affect the same.

9. In the method of making bottle closures by heat activation of a material, the steps consisting in depositing a plastic material within a closure shell, which material is capable of being activated by heat, and inducing electrical heating current within an electrical conducting material forming part of the closure to elevate the temperature of the plastic mass to a degree sufficient to activate the same, said activated mass forming a sealing liner within the closure.

10. In the method of making bottle closures by the activation of a material, the steps consisting in disposing a plastic material within a closure shell having a heat sensitive coating on the outer surface thereof, the plastic material being capable of heat activation, and inducing electrical heating current within an electrical current conducting shell forming part of the closure to elevate the temperature of the plastic mass to a degree sufficient to activate the same and form a sealing liner within the closure, while preventing any substantial rise in temperature of the coating applied to the outer surface of the shell sufficient to deleteriously affect the same.

11. In the method of making closures including an electrical current conducting shell and a heat activatable material bonded thereto, the step consisting in inducing electrical heating current within the shell in an amount sufficient to activate said activatable material, while establishing a temperature gradient in the shell highest at the surface to which the heat activatable material is to be bonded.

12. In the method of making closures, the steps consisting in providing a shell having a heat sensitive coating on the outer surface thereof and a heat activatable material disposed within the shell, and heating the shell while dissipating heat more rapidly from the outer surface than from the inner surface to which the heat activatable material is applied.

13. In the method of making closures including a heat activatable material bonded to a conductive shell having a decorative coating applied to the outer surface thereof, the steps consisting in elevating the temperature of at least that portion of the closure to engage the heat activatable material to be bonded thereto by inducing electric heating current in the conductive shell, conserving heat on the surface of the shell for engagement with the heat activatable material and dissipating heat from the decorated surface.

14. In the method of assembling closures including a shell, a heat activatable material bonded thereto, and a coating carried by the shell, which coating is deleteriously affected by elevated temperatures, the steps consisting in elevating the temperature of that surface of the shell to engage the heat activatable material to be bonded thereto and dissipating heat from the opposite surface at a rate sufficient to prevent the transfer of heat on an amount sufficient to deleteriously affect the coating.

15. In the method of assembling closures including a shell having a heat sensitive coating applied to the outer surface thereof and a heat activatable material bonded to the inner surface thereof, the steps consisting in raising the temperature of the surface of the shell to which said heat activatable material is to be secured to a temperature sufficient to activate said material and supplying cooling fluid to the outer surface of the shell whereby the temperature thereof is maintained below that at which the coating is deleteriously effected.

16. In the method of assembling closures including a shell, a heat activatable material bonded thereto and a coating carried by the shell, which coating is deleteriously affected by elevated temperatures, the steps consisting in raising the temperature of that portion of the shell to which said heat activatable material is to be secured to a temperature sufficient to activate the material while maintaining a cooling stream of air against said coating to obviate its attaining a deleteriously high temperature.

17. In the method of making closures including a metal shell having a heat activatable material and a coating disposed thereon, the steps consisting in activating the heat activatable material by an electric inductive heating action at a rate sufficient to activate said material while preventing any substantial rise in temperature of said coating sufficient to deleteriously affect the same.

18. In the method of making a closure including a shell, an electric conductive element associated therewith and a heat activatable material, the steps consisting in heating the electric conductive element by an electric inductive action to a temperature sufficient to activate the heat activatable material.

19. In the method of making closures, the steps consisting in positioning on a support a closure shell of electrical current conducting material having a sealing liner within the shell and a stratum of heat activatable adhesive disposed therebetween, applying pressure between said shell and said liner, heating said shell by inducing electrical heating current therein, and thereafter cooling said shell, said heating and cooling steps being effected without relative movement between the shell and the support.

20. In the method of making closures, the steps consisting in positioning on a support a closure shell of electrical current conducting material having a sealing liner within the shell and a stratum of heat activatable adhesive disposed therebetween, applying pressure between said shell and said liner, heating said shell and inducing electrical heating current therein in an amount sufficient to activate the adhesive and thereafter dissipating heat from the shell while maintaining pressure between the shell and liner, said shell being maintained without relative movement with respect to the support while the shell is heated to activation temperature.

RALPH R. CLARK.

CERTIFICATE OF CORRECTION.

Patent No. 2,184,281.   December 26, 1939.

RALPH R. CLARK.

It is hereby certified that error appears in the printed specification of the above numbered patent requiring correction as follows: Page 5, first column, line 6, claim 14, for the word "on" read in; and that the said Letters Patent should be read with this correction therein that the same may conform to the record of the case in the Patent Office.

Signed and sealed this 12th day of March, A. D. 1940.

Henry Van Arsdale,
Acting Commissioner of Patents.

(Seal)